US011662469B2

(12) United States Patent
Rawashdeh (10) Patent No.: US 11,662,469 B2
(45) Date of Patent: May 30, 2023

(54) SYSTEM AND METHOD FOR MERGING CLUSTERS

(71) Applicants: Denso International America, Inc., Southfield, MI (US); DENSO CORPORATION, Aichi-Pref (JP)

(72) Inventor: Zaydoun Rawashdeh, Farmington, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 1008 days.

(21) Appl. No.: 16/375,052

(22) Filed: Apr. 4, 2019

(65) Prior Publication Data

US 2020/0320339 A1  Oct. 8, 2020

(51) Int. Cl.
| | |
|---|---|
| *G06K 9/62* | (2022.01) |
| *G06T 7/521* | (2017.01) |
| *G06T 7/246* | (2017.01) |
| *G01S 17/42* | (2006.01) |
| *G01S 7/48* | (2006.01) |
| *G06V 20/56* | (2022.01) |

(52) U.S. Cl.
CPC .......... *G06K 9/6219* (2013.01); *G01S 7/4808* (2013.01); *G01S 17/42* (2013.01); *G06T 7/246* (2017.01); *G06T 7/521* (2017.01); *G06V 20/56* (2022.01); *G06T 2207/10028* (2013.01); *G06T 2207/30252* (2013.01)

(58) Field of Classification Search
None
See application file for complete search history.

(56) References Cited

U.S. PATENT DOCUMENTS 9,760,996 B2   9/2017  Chen et al.
10,140,550 B2  11/2018  Spampinato et al.
(Continued)

OTHER PUBLICATIONS

Ester et al., "A Density-Based Algorithm for Discovering Clusters in Large Spatial Databases with Noise," KDD, pp. 226-231 (1996).
(Continued)

*Primary Examiner* — Nicholas R Wilson
*Assistant Examiner* — Jed-Justin Imperial
(74) *Attorney, Agent, or Firm* — Christopher G. Darrow; Darrow Mustafa PC (57) ABSTRACT

A LiDAR point cloud that includes two candidate clusters for merging is received. At a first phase, a distance between the two clusters is determined. If the distance is greater than a threshold, the candidate clusters are not merged. Otherwise, an additional point cloud is received for each cluster at different times. A motion characteristic is determined for each cluster. If the motion characteristic for each cluster is close (indicating that the objects are moving at the same speed), then the clusters are merged. Otherwise the clusters are not merged. The motion characteristic for a cluster can be determined by performing an alignment operation using the point cloud received for the cluster, and using the error associated with the alignment operation as the motion characteristic for the cluster. The decision to merge clusters is based on raw point cloud data, which can take place early in the tracking cycle.

21 Claims, 5 Drawing Sheets

(56) References Cited

U.S. PATENT DOCUMENTS

| | | | | |
|---|---|---|---|---|
| 10,215,858 B1* | 2/2019 | Klein | ................... | G06V 20/64 |
| 2007/0024611 A1* | 2/2007 | Ingram | ................... | G06F 30/00 |
| | | | | 345/419 |
| 2008/0100438 A1* | 5/2008 | Marrion | ................ | G06V 20/52 |
| | | | | 340/555 |
| 2017/0193706 A1* | 7/2017 | Lo | ........................ | G06T 19/006 |
| 2020/0118277 A1* | 4/2020 | Mei | ........................... | G06T 7/11 |
| 2020/0247401 A1* | 8/2020 | Yao | ........................ | G01S 17/89 |

OTHER PUBLICATIONS

Petrovskaya and Thrun, "Model Based Vehicle Detection and Tracking for Autonomous Urban Driving," Autonomous Robots, 29, 123-139 (2009).
Men et al., "Color Point Cloud Registration with 4D ICP Algorithm," 2011 IEEE International Conference on Robotics and Automation, pp. 1511-1516 (2011).
Granger and Pennec, "Multi-scale EM-ICP: A Fast and Robust Approach for Surface Registration," ECCV, pp. 418-432 (2002).
Vlaminck et al., "Towards online mobile mapping using inhomogeneous lidar data," 2016 IEEE Intelligent Vehicles Symposium (Abstract).

\* cited by examiner

SYSTEM AND METHOD FOR MERGING CLUSTERS

TECHNICAL FIELD

The subject matter described herein relates, in general, to systems and methods for merging clusters, and, in particular, to merging clusters by considering both of the distance between the clusters and motion characteristics of the clusters.

BACKGROUND

LiDAR sensors typically operate by generating a series of point clouds. Each point in the point cloud represents an interaction with an object of a plurality of objects and a laser of the LiDAR sensor. Segmentation is the process of segmenting the points of the point cloud into clusters based on the object that each point likely interacted with. As may be appreciated, the clusters may be used for a variety of autonomous driving functions such as object detection and vehicle navigation.

Cluster merging is the process of combining or merging clusters of points that likely represent the same object. Currently, most segmentation algorithms consider geometry and distance when determining whether to merge to clusters. Depending on the algorithm selected, and the particular parameters used, these algorithms can lead to over-segmentation (a single object is divided into multiple clusters), or under-segmentation (multiple objects are part of a single cluster). Moreover, as will be described further below, these algorithms are particularly susceptible to over-segmentation when the LiDAR sensor is occluded by an object.

SUMMARY

In one embodiment, example systems and methods related to determining when to merge clusters are provided. A LiDAR point cloud that includes two candidate clusters for merging is received. At a first phase, a distance between the two clusters is determined. If the distance is greater than a threshold, the candidate clusters are not merged. Otherwise, an additional point cloud is received for each cluster at different times. A motion characteristic is determined for each cluster based on the point cloud received for each cluster. If the motion characteristic for each cluster is close (indicating that the objects represented by the clusters are moving at the same speed), then the clusters are merged. Otherwise the clusters are not merged. The motion characteristic for a cluster can be determined by performing an alignment operation using the point cloud received for the cluster, and using the error associated with the alignment operation as the motion characteristic for the cluster.

In one embodiment, a system for merging clusters is provided. The system includes one or more processors and a memory communicably coupled to the one or more processors and storing a distance module and a motion module. The distance module includes instructions that when executed by the one or more processors cause the one or more processors to: receive a first point cloud for a first cluster and a second cluster, wherein the first point cloud includes a first plurality of points for the first cluster and a first plurality of points for the second cluster; and determine a distance between the first cluster and the second cluster. The motion module includes instructions that when executed by the one or more processors cause the one or more processors to: when a determination is made that the distance satisfies a first threshold: receive a second point cloud for the first cluster and the second cluster, wherein the second point cloud includes a second plurality of points for the first cluster and a second plurality of points for the second cluster; receive a third point cloud for the first cluster and the second cluster, wherein the third point cloud includes a third plurality of points for the first cluster and a third plurality of points for the second cluster; based on the first plurality of points for the first cluster, the second plurality of points for the first cluster, and the third plurality of points for the first cluster, determine a first motion characteristic of the first cluster; based on the first plurality of points for the second cluster, the second plurality of points for the second cluster, and the third plurality of points for the second cluster, determine a second motion characteristic of the second cluster; and when a determination is made that the first motion characteristic and the second motion characteristic satisfy a second threshold: determine to merge the first cluster and the second cluster.

In one embodiment, a method for merging clusters is provided. The method includes: receiving a first point cloud for a first cluster and a second cluster, wherein the first point cloud includes a first plurality of points for the first cluster and a first plurality of points for the second cluster; determining a distance between the first cluster and the second cluster; when a determination is made that the distance satisfies a first threshold: receiving a second point cloud for the first cluster and the second cluster, wherein the second point cloud includes a second plurality of points for the first cluster and a second plurality of points for the second cluster; receiving a third point cloud for the first cluster and the second cluster, wherein the third point cloud includes a third plurality of points for the first cluster and a third plurality of points for the second cluster; based on the first plurality of points for the first cluster, the second plurality of points for the first cluster, and the third plurality of points for the first cluster, determining a first motion characteristic for the first cluster; based on the first plurality of points for the second cluster, the second plurality of points for the second cluster, and the third plurality of points for the second cluster, determining a second motion characteristic for the second cluster; and when a determination is made is determined that the first motion characteristic and the second motion characteristic satisfy a second threshold: determining to merge the first cluster and the second cluster.

In one embodiment, a method for merging clusters is disclosed. The method includes: receiving a first point cloud for a first cluster and a second cluster, wherein the first point cloud includes a first plurality of points for the first cluster and a first plurality of points for the second cluster; determining a distance between the first cluster and the second cluster; when a determination is made is determined that the distance satisfies a first threshold: receiving a second point cloud for the first cluster and the second cluster, wherein the second point cloud includes a second plurality of points for the first cluster and a second plurality of points for the second cluster; based on the first plurality of points for the first cluster and the second plurality of points for the first cluster, determining a first motion characteristic for the first cluster; based on the first plurality of points for the second cluster and the second plurality of points for the second cluster, determining a second motion characteristic for the second cluster; and when a determination is made is determined that the first motion characteristic and the second motion characteristic satisfy a second threshold: determining to merge the first cluster and the second cluster.

The systems and methods described herein allow for merging decisions with respect to clusters to be made as early as possible in the object tracking cycles, which can be achieved using raw point cloud data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with merging clusters based on both the distance between the clusters and motion characteristics of the clusters are disclosed. As mentioned previously, a LiDAR sensor generates point clouds that represent the reflections of the lasers of the LiDAR sensor off of objects of a plurality of objects in the scanning environment of the LiDAR sensor. The points of the point cloud can be segmented into clusters that purport to represent points that were reflected off of the same object. The clusters can be further merged when the clusters likely represent the same object.

Current systems and methods for merging clusters typically consider the distances between the clusters (and other geometric information) when determining whether or not to merge clusters. However, merging clusters based on distance alone may lead to over-segmenting the clusters, especially when the LiDAR sensor view is occluded by one or more other objects.

Figure 3:
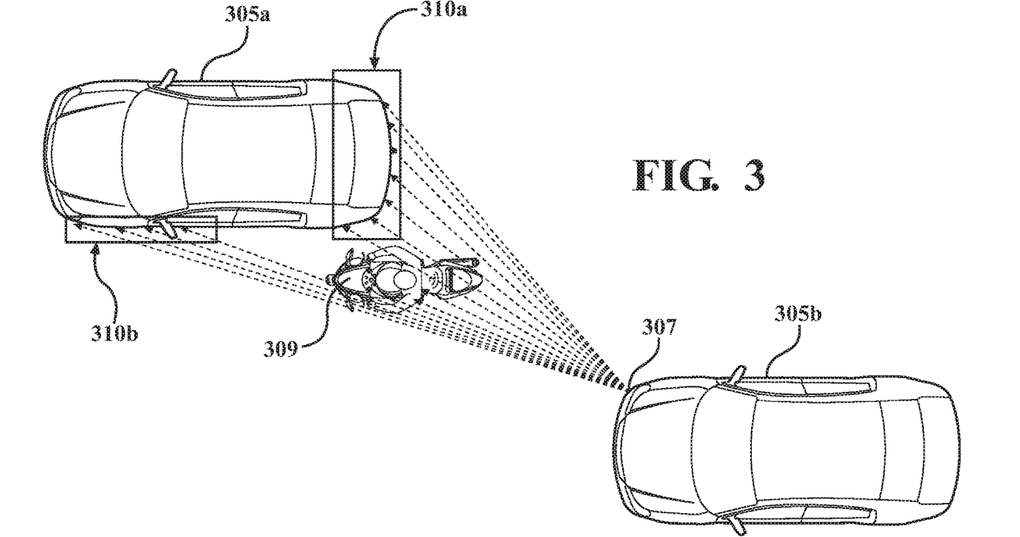
FIG. 3 is an illustration of LiDAR sensor occlusion.

For example, FIG. 3 is an illustration of LiDAR sensor occlusion. In the example shown, a vehicle 305b includes a LiDAR sensor 307 that is scanning a vehicle 305a. However, between the vehicle 305a and the LiDAR sensor 307 is a motorcycle 309 that is occluding the view of the LiDAR sensor 307. As a result, the scan of the vehicle 305a has resulted in two clusters (i.e., the clusters 310a and 310b).

As can be seen in FIG. 3, the clusters 310a and 310b are both associated with the same object (i.e., the vehicle 305a) and ideally should be merged. However, the distance between the clusters 310a and 310b is large, making it unlikely that a conventional merging algorithm that only considers the distance between clusters and estimated dimensions would correctly merge the clusters 310a and 310b.

To solve the problem of over-clustering associated with current cluster merging algorithms, a cluster merging system 170 (see FIGS. 1 and 2) is provided. The cluster merging system 170 merges clusters based on distance and what is referred to as motion characteristics. The motion characteristic for a cluster is a characteristic that is related to the speed or velocity of the cluster. Intuitively, if two clusters have similar speeds relative to a LiDAR sensor, and therefore similar motion characteristics, they are more likely to represent the same object than two clusters with dissimilar speeds or motion characteristics. Because the cluster merging system 170 considers both distance and motion characteristics, more clusters separated by larger distances may be considered for merging than with conventional distance-only merging algorithms. Accordingly, the cluster merging system 170 described herein avoids both the under-clustering and the over-clustering associated with current cluster merging algorithms.

Figure 1:
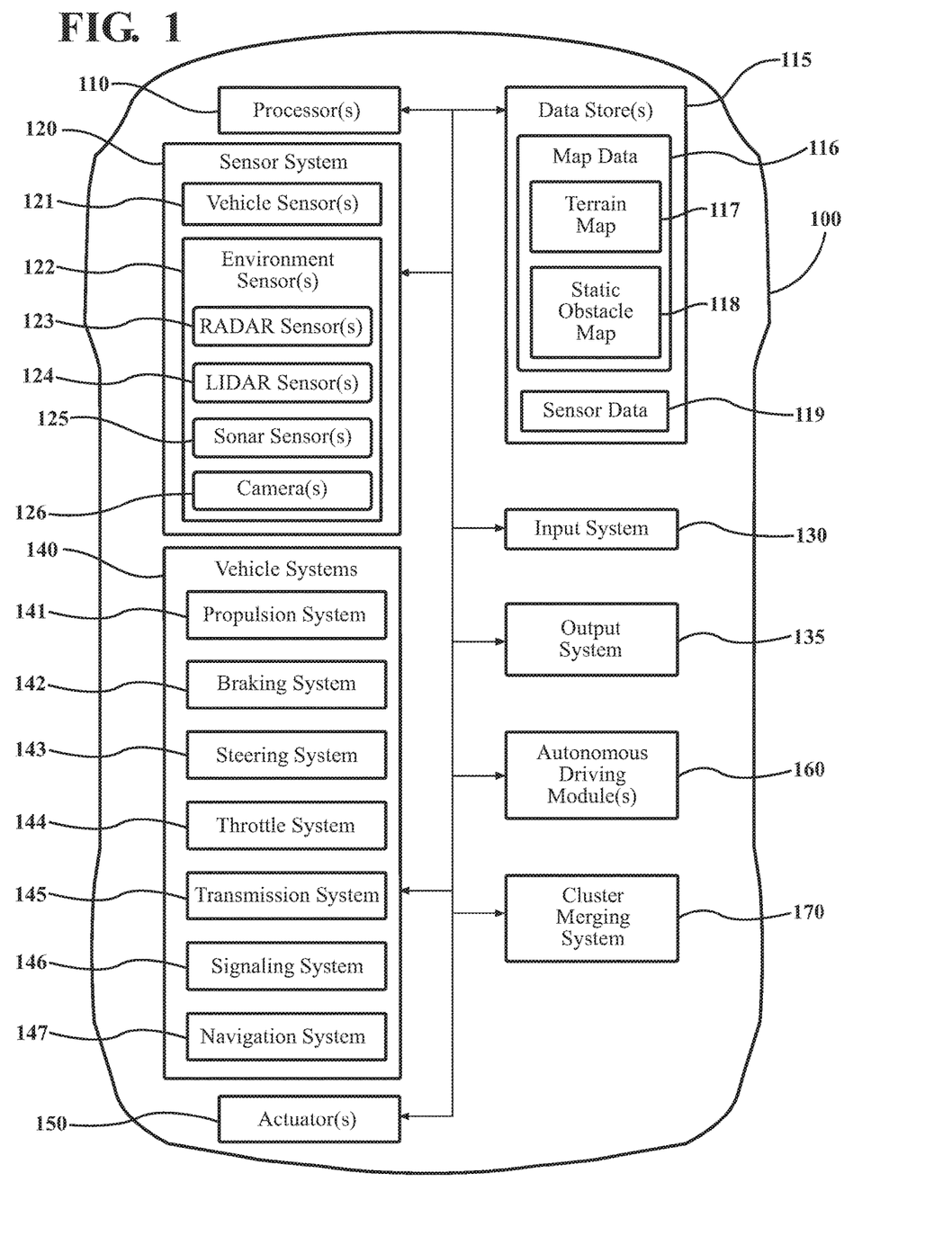
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the cluster merging system 170 that is implemented to merge clusters generated by a LiDAR sensor. The noted functions and methods will become more apparent with a further discussion of the figures.

Figure 2:
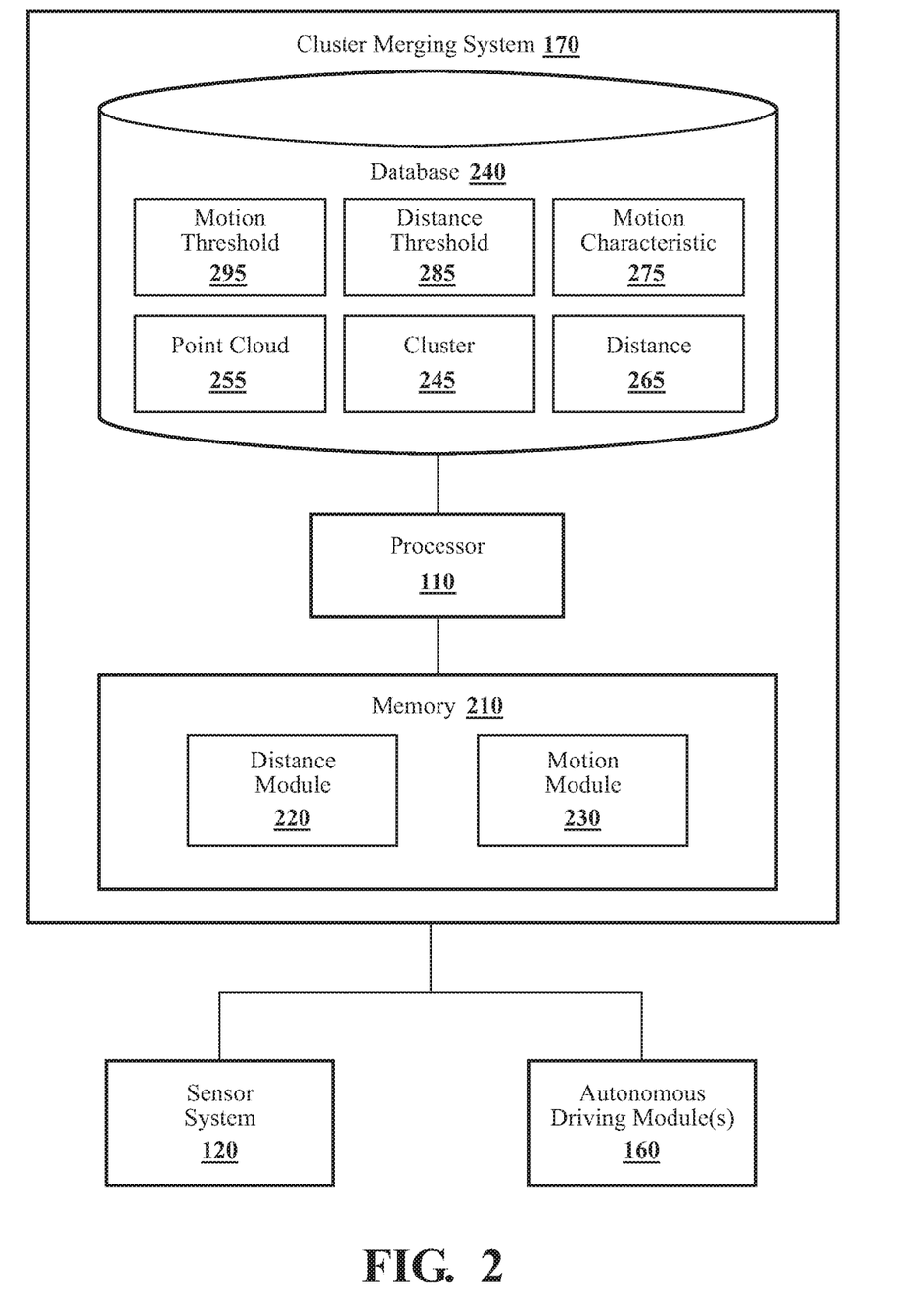
FIG. 2 illustrates one embodiment of a cluster merging system.

With reference to FIG. 2, one embodiment of the cluster merging system 170 of FIG. 1 is further illustrated. The cluster merging system 170 is shown as including a processor 110 from the vehicle 100 of FIG. 1. Accordingly, the processor 110 may be a part of the cluster merging system 170, the cluster merging system 170 may include a processor seperate from the processor 110 of the vehicle 100, or the cluster merging system 170 may access the processor 110 through a data bus or another communication path. It should be appreciated, that while the cluster merging system 170 is illustrated as being a single contained system, in various embodiments, the cluster merging system 170 is a distributed system that is comprised of components that can be provided as a centralized server, a cloud-based service, and so on.

In one embodiment, the cluster merging system 170 includes a memory 210 that stores a distance module 220 and a motion module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. Moreover, as previously noted, in various embodiments, one or more aspects of the cluster merging system 170 are implemented as cloud-based services, and so on. Thus, one or more modules of the cluster merging system 170 may be located remotely from other components and may be implemented in a distributed manner.

Furthermore, in one embodiment, the cluster merging system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes a point cloud 255 along with, for example, other information that is used and/or generated by the modules 220 and 230 such as a cluster 245, a motion threshold 295, a distance threshold 285, a distance 265, and a motion characteristic 275. Of course, in further embodiments, the various information may be stored within the memory 210 or another suitable location.

The distance module 220 is configured to receive a point cloud 255 that includes two clusters 245. The clusters 245 may be candidate clusters for merging into a single cluster 245. Each cluster 245 may comprise a plurality of points. The point cloud 255 may be associated with a particular time that the point cloud 255 was generated or received. Depending on the embodiment, the point cloud 255 may be generated by, and received from, one or more LIDAR sensors 124 of the sensor system 120. The clusters 245 may have been determined by one or more clustering algorithms applied to the point cloud 255.

The distance module 220 is further configured to determine a distance 265 between the two clusters 245. Depending on the embodiment, the determined distance 265 may be the smallest distance between any two points selected from each of the two clusters 245. However, other methods or techniques for determining the distance 265 may be used such as the average distance between points of the two clusters 245 or a distance 265 based on the geometric centers of the two clusters 245. A particular method used to determine or define the distance 265 may be selected by a user or administrator.

Figure 4:
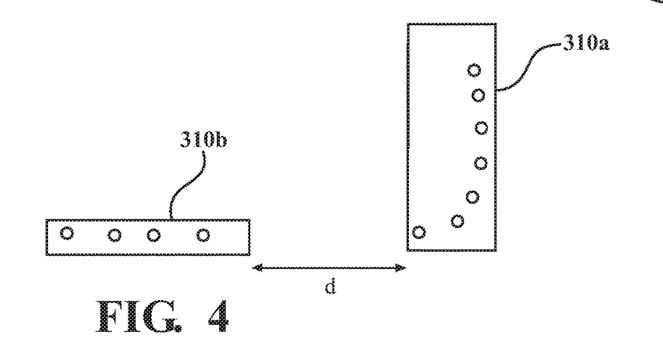
FIG. 4 is an illustration of two clusters.

For example, FIG. 4 shows an illustration of the clusters 310a and 310b determined from the point cloud 255 generated by the LiDAR sensor 307 of FIG. 3. In the example shown, the distance 265 ("d") is the distance between the right-most point of the cluster 310b and the left-most point of the cluster 310a. Note, that while the clusters 310a and 310b are shown as being comprised of two-dimensional ("2D") points, it is for illustrative purposes only. The clusters 245, and the related point clouds 255, may include three-dimensional ("3D") points.

Returning to FIG. 2, the distance module 220 is further configured to determine if the distance 265 is less than a distance threshold 285. If the distance 265 is less than the distance threshold 285, then, as will be described further below, the two clusters 245 may be further considered for merging by the motion module 230. If the distance 265 is not less than the distance threshold 285, then the distance module 220 may determine not to merge the two clusters 245.

Depending on the embodiment, the clusters 245 may ultimately be used by one or more autonomous driving modules 160 of the vehicle 100 to provide autonomous driving functions such as object detection and vehicle navigation. Accordingly, the distance threshold 285 may be selected based on the average or typical size of a vehicle 100. By sizing the distance threshold 285 based on the size of a vehicle 100, clusters 245 that are associated with the front portion and the rear portion of a vehicle 100 may be considered for merging by the motion module 230. The particular value for the distance threshold 285 may be selected by a user or administrator. Note that because the motion module 230 further considers motion characteristics 275 when merging clusters 245, the size of the distance threshold 285 may be greater than the distance thresholds 285 used by conventional cluster merging algorithms.

The motion module 230 may receive the clusters 245 after having passed the distance threshold 285 from the distance module 220, and may calculate a motion characteristic 275 for each cluster 245. The motion characteristic 275 for a cluster 245 may be related to the speed or velocity of the object associated with the cluster 245 relative to the LiDAR sensor. The particular methods and techniques for calculating a motion characteristic are described further below.

The motion module 230 may compare the motion characteristics 275 for the clusters 245 to a motion threshold 295 to determine whether or not to merge the clusters 245. As may be appreciated, the closer the motion characteristics 275 determined for the clusters 245, the closer the speeds of the objects that are associated with the clusters 245. Accordingly, in some embodiments, the motion module 230 may calculate a difference between the motion characteristics 275, and may determine to merge the clusters 245 if the determined difference is less than the motion threshold 295. In other embodiments, the motion module 230 may calculate a ratio of the motion characteristics 275, and may determine to merge the clusters 245 if the ratio is less than the motion threshold 295. Else, the motion module 230 may determine not to merge the clusters 245.

The value of the motion threshold 295 may be set by a user or administrator. A motion threshold 295 of zero would allow the merging of only clusters 245 having identical motion characteristics 275. Similarly, the greater the motion threshold 295 the more dissimilar the motion characteristics 275 of two merged clusters 245.

In some embodiments, the motion module 230 may determining the motion characteristics 275 for each cluster 245 by performing a cluster alignment operation. To perform the cluster alignment operation the motion module 230 may receive an additional point cloud 255 for the cluster 245 taken at a different time from the initial point cloud 255 received by the distance module 220. The alignment operation for a cluster 245 may then attempt to align each point of the original point cloud 255 that is part of the cluster 245 with each point of the additional point cloud 255 that is also part of the same cluster 245.

One example of suitable alignment operation is the trimmed iterative closest point algorithm ("TrICP"). As will be discussed further below, the TrICP algorithm generates a rotation value R, a transformation value T, and an error value RisErr that can be used to align the points of the cluster 245 across the two sets of point clouds 255. Assuming that the object represented by the cluster 245 is moving at a uniform speed between LiDAR sensor scans, any of the values R, T, and RisErr, alone or in combination, can be used as the motion characteristic 275 for the cluster 245.

Figure 5:
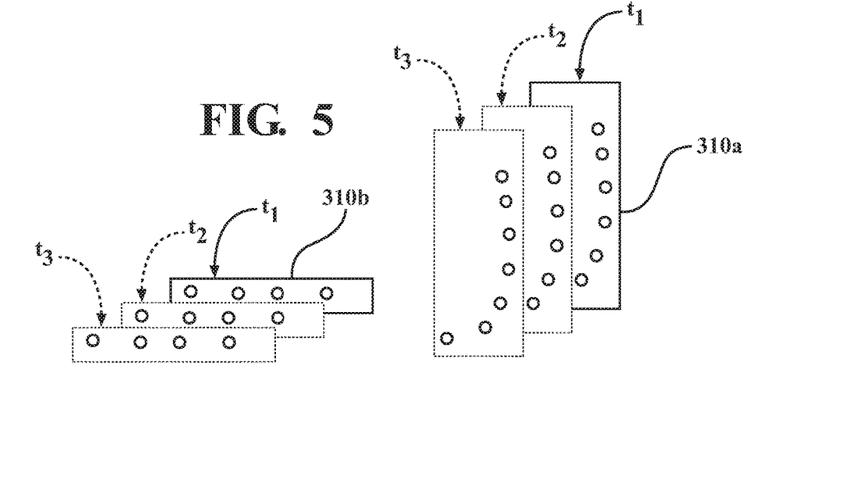
FIG. 5 is an illustration of point clouds.

In one embodiment, the motion module 230 may calculate the motion characteristics 275 for a first cluster 245 and a second cluster 245 by collecting three sets of point clouds 255, with each set of point cloud 255 associated with a different time t. Continuing to FIG. 5, illustrations of the point clouds 255 used for the clusters 310a and 310b are shown. Each of clusters 310a and 310 b is associated with point clouds 255 taken at times t1, t2, and t3. Each point cloud 255 includes all of the points associated with a corresponding one of the clusters 310a and 310b.

The points p of the first cluster 245 (the cluster A) and the points p of the second cluster 245 (the cluster B) as included in the point cloud 255 corresponding to each time t can be represented as $C_{a,t1}=\{p_i\}_{i=1}^{a_n}$ and $C_{b,t1}=\{p_i\}_{i=1}^{b_n}$ respectively, where n is the number of points in each cluster 245 and $n_a \neq n_b$. The motion module 230 may then apply the alignment operation as follows.

After the motion module 230 receives the $k^{th}$ scan (i.e., t3 in FIG. 5), there are $\{C_{a,t1}, C_{a,t2}, C_{a,tk}\}$ sets of points for the cluster A and $\{C_{b,t1}, C_{b,t2}, C_{a,tk}\}$ sets of points for the cluster B. Since the associated object may be assumed to have constant speed over a short period of time, then the two split clusters that resulted from over-segmentation would have the same constant speed over the same period. Therefore, for each cluster, the motion module 230 may select the points from the point cloud 255 associated with t2 as the reference frame and apply the TrICP algorithm. For each alignment iteration, the motion module 230 may compute the error RisErr. Depending on the embodiment, the RisErr may be the mean square error between the model (the points from t2 used as the reference frame) and the transformed points. For example, for cluster A, the motion module 230 may select the set $C_{a,ti}$ in the middle and apply the TrICP algorithm to generate the point cloud alignment follows:

1—Execute pairwise alignment between $C_{a,t1}$ and $C_{a,ti}$ and $C_{a,ti}$ and $C_{a,tk}$ and get k/2 point clouds after the merging.
2—Repeat pairwise alignment for the merged point sets to get one final merged point cloud.
    The motion module 230 may execute the same procedure for the $\{C_{b,t1}, C_{b,t2}, C_{a,tk}\}$ sets associated with the cluster B For each step of point cloud alignment, the motion module 230 may store the values of R, t and RisErr. For example, for the i-th alignment step the motion module 230 may store $[R,t]_{a,ti}$ and $[R,t]_{b,ti}$ representing the R and t values generated at the i-th alignment step for the clusters A and B respectively. The motion module 230 may further store $[RisErr]_{a,ti}$ and $[RisErr]_{b,ti}$ generated at the i-th alignment step. Accordingly, for each cluster there will be multiple sets of R, t and RisErr generated by the motion module 230. As may be appreciated, any of the values of $[R,t]_{a,ti}$ and $[R,t]_{b,ti}$ or $[RisErr]_{a,ti}$ and $[RisErr]_{b,ti}$ at the i-th alignment step may be used by the motion module 230 as the motion characteristics 275 for the cluster A and the cluster B.

The motion module 230 may determine if the motion characteristics 275 associated with two clusters A and B are equivalent (i.e., satisfy the motion threshold 295) and therefore may be merged. In some embodiments, the motion module 230 may use the motion characteristics 275 determined for each cluster 245 from m steps out of the k total alignment steps that were performed by the motion module 230. In particular, the motion modules 230 may take samples from each set of motion characteristics 275 and may calculate the mean, $\mu_{a,t}$ and $\mu_{b,t}$ (or $\mu_{a,RisErr}$ and $\mu_{b,RisErr}$) for both clusters at selected i-th alignment step. The equivalence can be defined as the situation in which the ratio of means $\Delta_L \leq \mu_{a,t}/\mu_{b,t} \geq \Delta_H$ ($\Delta_L \leq_{RisErr} /\mu_{b,RisErr} \geq \Delta_H$). The difference between means can also be used $\Delta_L \leq \mu_{a,t} - \mu_{b,t} \geq \Delta_H$ ($\Delta_L \leq_{RisErr\ t} - \mu_{b,RisErr} \geq \Delta_H$). $\Delta_L$ and $\Delta_H$ in this example are the motion thresholds 295 and may be selected by a user or administrator.

Figure 6:
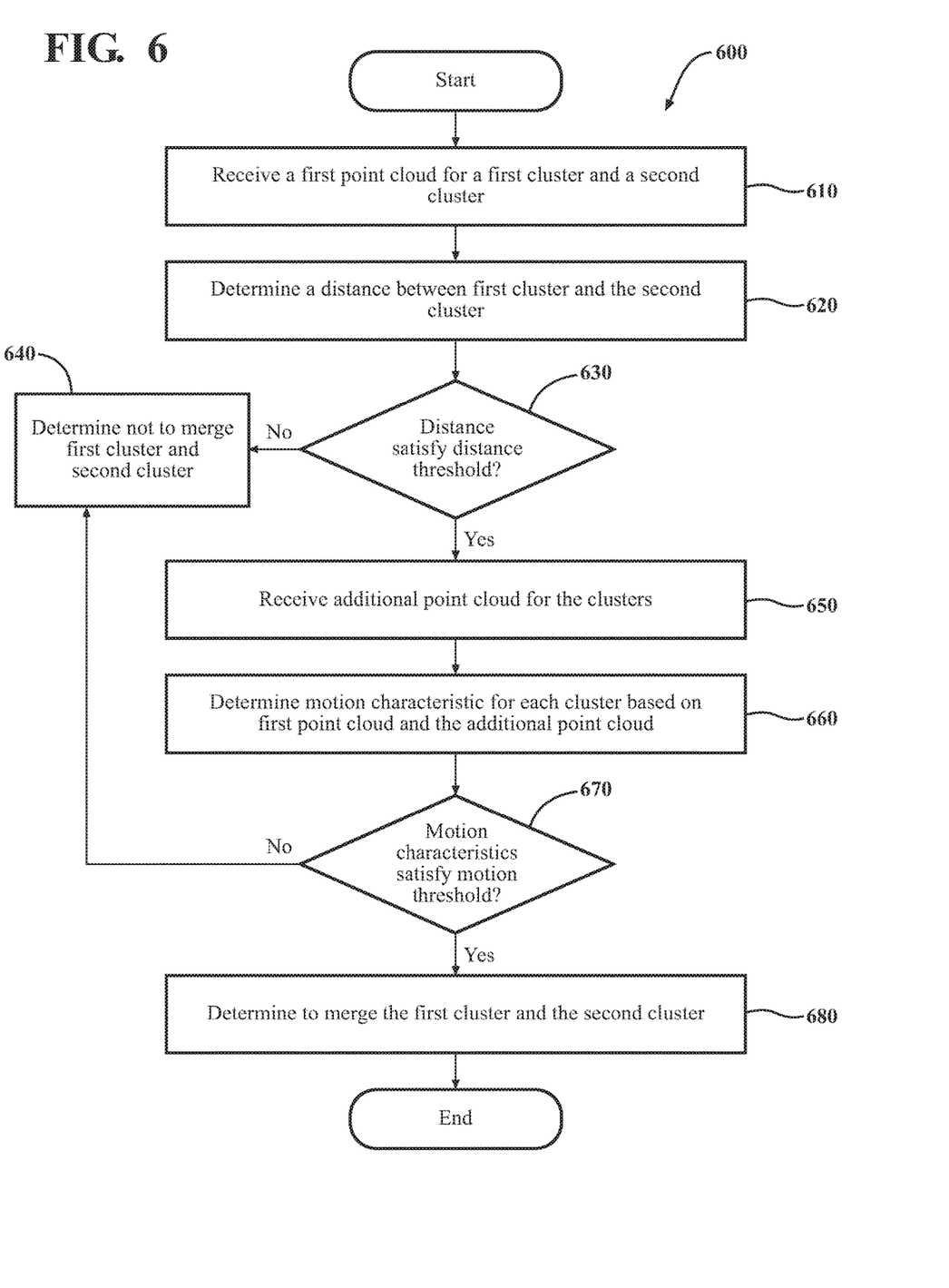
FIG. 6 illustrates a flowchart of a method that is associated with merging point clusters based on motion characteristics.

Additional aspects of determining to merge point clusters will be discussed in relation to FIG. 6. FIG. 6 illustrates a flowchart of a method 600 that is associated with merging point clusters based on motion characteristics. The method 600 will be discussed from the perspective of the cluster merging system 170 of FIGS. 1 and 2. While the method 600 is discussed in combination with the cluster merging system 170, it should be appreciated that the method 600 is not limited to being implemented within the cluster merging system 170 but is instead one example of a system that may implement the method 600.

At 610, the distance module 220 receives a first point cloud 255. The first point cloud 255 may include a plurality of 3D points. Some of the points are associated with a first cluster 245 and some of the points are associated with a second cluster 245. Depending on the embodiment, the first point cloud 255 may be received from a LiDAR sensor 124 and/or a cluster determination algorithm.

At 620, the distance module 220 determines a distance 265 between the first cluster 245 and the second cluster 245. The distance 265 may be the shortest distance between a point of the first cluster 245 and a point of the second cluster 245. Other distances 265 may be used. Any method for determining a distance 265 between clusters 245 may be used.

At 630, the distance module 220 determines if the determined distance 265 satisfies a distance threshold 285. In some embodiments, the determined distance 265 may satisfy the distance threshold 285 when the determined distance 265 is less than the distance threshold 285. The distance threshold 285 may be sized based on an average size of a vehicle 100, for example. Other distance thresholds 285 may be used. If the distance module 220 determines that the distance 265 satisfies the distance threshold 285 then the method 600 may continue at 650. Else, the method 600 may continue at 640.

At 640, the cluster merging system 170 determines not to merge the first cluster 245 and the second cluster 245. After determining not to merge the first cluster 245 and the second cluster 245, the cluster merging system 170 may provide the first and second clusters 245 to one or more autonomous driving modules 160. The method 600 may then exit.

At 650, the motion module 230 receives an additional point cloud 255 for the clusters 245. The additional point clouds 255 may be associated with a time that is after the time associated with the first point cloud 255. Like the first point cloud 255, the additional point cloud 255 may include a plurality of points including points associated with each of the first cluster 245 and the second cluster 245. Depending on the embodiment, the motion module 230 may receive two additional point clouds 255.

At 660, the motion module 230 determines motion characteristics 275 for each cluster 245. Depending on the embodiment, the motion module 230 may determine a motion characteristic 275 for a cluster 245 using the first point cloud 255 and the additional point cloud 255 using an alignment algorithm such as the TrICP algorithm. Other algorithms may be used. Depending on the embodiment, the motion characteristic 275 may be set according to one, some, or all of the values of R,T, and RisErr values determined by the TrICP algorithm.

At 670, the motion module 230 determines whether the motion characteristics 275 of the first cluster 245 and the second cluster 245 satisfy a motion threshold 295. The motion threshold 295 may be satisfied when the motion characteristics 275 of the first cluster 245 and the second cluster 245 are similar. In some embodiments, the motion module 230 may calculate a ratio of the motion characteristics 275, and may determine that the motion threshold 295 is satisfied when the ratio is less than the motion threshold 295. In other embodiments, the motion module 230 may calculate a difference between the motion characteristics 275, and may determine that the motion threshold 295 is satisfied when the difference is less than the motion threshold 295. Other types of thresholds may be used. If the motion threshold 295 is satisfied, the method 600 may continue at 680. Else, the method 600 may continue at 640.

At 680, the motion module 230 determines to merge the first cluster 245 and the second cluster 245. The cluster merging system 170 may then provide the merged cluster 245 to one or more autonomous driving modules 160. The method 600 may then exit.

Figure 7:
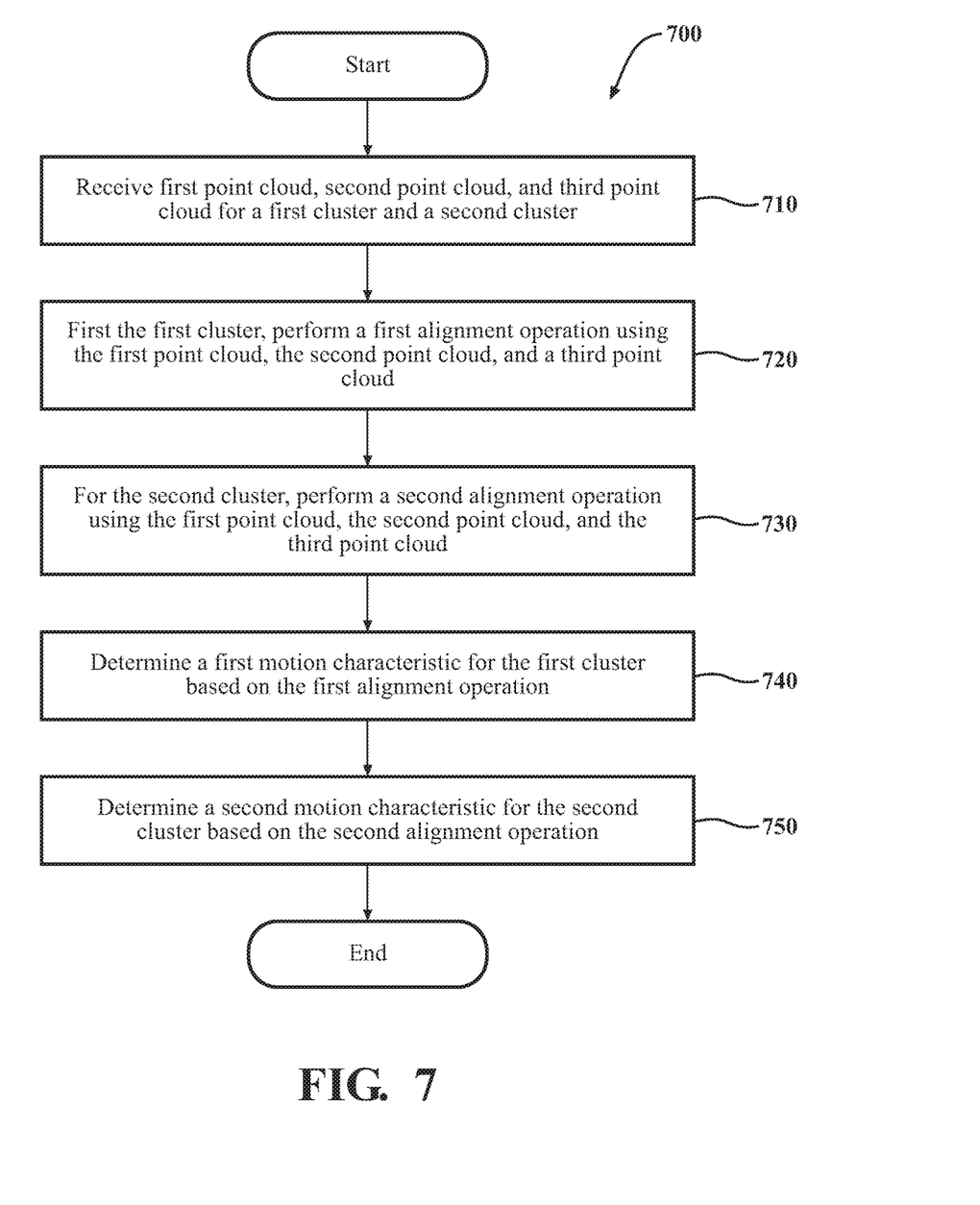
FIG. 7 illustrates a flowchart of a method that is associated with determining motion characteristics for clusters.

Additional aspects of merging clusters will be discussed in relation to FIG. 7. FIG. 7 illustrates a flowchart of a method 700 that is associated with determining motion characteristics 275 for clusters 245. The method 700 will be discussed from the perspective of the cluster merging system 170 of FIGS. 1 and 2. While the method 700 is discussed in combination with the cluster merging system 170, it should be appreciated that the method 700 is not limited to being implemented within the cluster merging system 170 but is instead one example of a system that may implement the method 700.

At 710, the motion module 230 receives point clouds 255 for a first cluster 245 and a second cluster 245. Each point cloud 255 may include a plurality of points and each point may be part of the first cluster 245 or the second cluster 245. In some embodiments, each point cloud 255 may correspond to a different time t. There may be a first point cloud 255 received for a time t1, a second point cloud 255 received for a time t2, and a third point cloud 255 received for a time t3. More or fewer point clouds 255 may be received. The number of point clouds 255, and the time between each point cloud 255, may be set by a user or administrator. Each point cloud 255 may be generated by a LiDAR sensor 124 and the first and second clusters 245 may have been determined using a clustering algorithm.

At 720, the motion module 230 performs an alignment operation for the first cluster 245 using the received point clouds 255. In some embodiments, the alignment operation may be the TrICP algorithm and may generate an alignment between the points of the first cluster 245 from the first point cloud 255 and the second point cloud 255, and the points of the first cluster 245 from the third point cloud 255 and the second point cloud 255. The results of the TrICP algorithm for the first cluster 245 may include some or all of R,T, and RisErr values for the first cluster 245.

At 730, the motion module 230 performs an alignment operation for the second cluster 245 using the received point clouds 255. Similar to the first cluster 245, the alignment operation may be the TrICP algorithm and may generate an alignment between the points of the second cluster 245 from the first point cloud 255 and the second point cloud 255, and the points of the second cluster 245 from the third point cloud 255 and the second point cloud 255.

At 740, the motion module 230 determines a first motion characteristic 275 for the first cluster 245. The motion module 230 may determine the first motion characteristic 275 based on the alignment operation performed at 720. Depending on the embodiment, the motion module 230 may determine the first motion characteristic 275 using some or all of R,T, and RisErr values determined by the alignment operation. Other methods for determining a motion characteristic 275 of a cluster 245 may be used.

At 750, the motion module 230 determines a second motion characteristic 275 for the first cluster 245. Similar to the first cluster 245, the motion module 230 may determine the second motion characteristic 275 based on the alignment operation performed at 730. Depending on the embodiment, the motion module 230 may determine the second motion characteristic 275 using some or all of R,T, and RisErr values determined by the alignment operation. Other methods for determining a motion characteristic 275 of a cluster 245 may be used.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the cluster merging system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the cluster merging system 170, and/or the autonomous driving module(s) 160 may control some or all of these vehicle systems 140 and, thus, may be partially or fully autonomous.

The processor(s) 110, the cluster merging system 170, and/or the autonomous driving module(s) 160 can be operatively connected to communicate with the various vehicle systems 140 and/or individual components thereof. For example, returning to FIG. 1, the processor(s) 110, the cluster merging system 170, and/or the autonomous driving module(s) 160 can be in communication to send and/or receive information from the various vehicle systems 140 to control the movement, speed, maneuvering, heading, direction, etc. of the vehicle 100. The processor(s) 110, the cluster merging system 170, and/or the autonomous driving module(s) 160 may control some or all of these vehicle systems 140.

The processor(s) 110, the cluster merging system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the cluster merging system 170, and/or the autonomous driving module(s) 160 can control the direction and/or speed of the vehicle 100. The processor(s) 110, the cluster merging system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the cluster merging system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for merging clusters comprising:
one or more processors;
a memory communicably coupled to the one or more processors and storing:
a distance module including instructions that when executed by the one or more processors cause the one or more processors to:
receive, at a first time, a first point cloud for a first cluster and a second cluster, wherein the first point cloud includes a first plurality of points for the first cluster and a first plurality of points for the second cluster; and
determine a distance between the first cluster and the second cluster; and
a motion module including instructions that when executed by the one or more processors cause the one or more processors to:
in response to a determination that the distance satisfies a first threshold:
receive, at a second time, a second point cloud for the first cluster and the second cluster, wherein the second point cloud includes a second plurality of points for the first cluster and a second plurality of points for the second cluster;
receive, at a third time, a third point cloud for the first cluster and the second cluster, wherein the third point cloud includes a third plurality of points for the first cluster and a third plurality of points for the second cluster;
determine, based on the first plurality of points for the first cluster, the second plurality of points for the first cluster, and the third plurality of points for the first cluster, a first motion characteristic of the first cluster; and
determine, based on the first plurality of points for the second cluster, the second plurality of points for the second cluster, and the third plurality of points for the second cluster, a second motion characteristic of the second cluster; and
in response to a determination that the first motion characteristic and the second motion characteristic satisfy a second threshold:
determine to merge the first cluster and the second cluster.

2. The system of claim 1, wherein the distance module further includes instructions that when executed by the one or more processors cause the one or more processors to:
in response to a determination that the distance does not satisfy the first threshold:
determine not to merge the first cluster and the second cluster.

3. The system of claim 1, wherein the motion module further includes instructions that when executed by the one or more processors cause the one or more processors to:
in response to a determination that the first motion characteristic and the second motion characteristic do not satisfy the second threshold:
determine not to merge the first cluster and the second cluster.

4. The system of claim 1, wherein the instructions to determine the first motion characteristic for the first cluster comprise:
instructions to perform a first alignment operation using the first plurality of points of the first cluster, the second plurality of points of the first cluster, and the third plurality of points of the first cluster;
instructions to determine, based on a result of the first alignment operation, one or more of a rotation value, a transformation value, and or an error value for the first cluster; and
instructions to determine the first motion characteristic using the one or more of the rotation value, the transformation value, or the error value determined for the first cluster.

5. The system of claim 4, wherein the instructions to determine the second motion characteristic for the second cluster comprises:
instructions to perform a second alignment operation using the first plurality of points of the second cluster, the second plurality of points of the second cluster, and the third plurality of points of the second cluster;
instructions to determine, based on a result of the second alignment operation, one or more of a rotation value, a transformation value, or an error value for the second cluster; and
instructions to determine the second motion characteristic using the one or more of the rotation value, the transformation value, or the error value determined for the second cluster.

6. The system of claim 4, wherein instructions to perform the first alignment operation use a trimmed iterative closest point algorithm.

7. The system of claim 1, wherein the first point cloud is generated by a LiDAR sensor.

8. The system of claim 1, wherein the distance module further includes instructions to select the first threshold based on a size of a vehicle.

9. The system of claim 1 wherein a boundary around the first plurality of points for the first cluster lacks a point of intersection with a boundary around the first plurality of points for the second cluster.

10. A method for merging clusters comprising:
receiving, at a first time, a first point cloud for a first cluster and a second cluster, wherein the first point cloud includes a first plurality of points for the first cluster and a first plurality of points for the second cluster;
determining a distance between the first cluster and the second cluster;
in response to a determination that the distance satisfies a first threshold:

receiving, at a second time, a second point cloud for the first cluster and the second cluster, wherein the second point cloud includes a second plurality of points for the first cluster and a second plurality of points for the second cluster;

receiving, at a third time, a third point cloud for the first cluster and the second cluster, wherein the third point cloud includes a third plurality of points for the first cluster and a third plurality of points for the second cluster;

determining, based on the first plurality of points for the first cluster, the second plurality of points for the first cluster, and the third plurality of points for the first cluster, a first motion characteristic for the first cluster; and determining, based on the first plurality of points for the second cluster, the second plurality of points for the second cluster, and the third plurality of points for the cluster, a second motion characteristic for the second cluster; and in response to a determination that the first motion characteristic and the second motion characteristic satisfy a second threshold:
determining to merge the first cluster and the second cluster.

11. The method of claim 10, further comprising:
in response to a determination that the distance does not satisfy the first threshold:
determining not to merge the first cluster and the second cluster.

12. The method of claim 10, further comprising:
in response to a determination that the first motion characteristic and the second motion characteristic do not satisfy the second threshold:
determining not to merge the first cluster and the second cluster.

13. The method of claim 10, wherein the determining the first motion characteristic for the first cluster comprises:
performing a first alignment operation using the first plurality of points of the first cluster, the second plurality of points of the first cluster, and the third plurality of points of the first cluster;
determining, based on a result of the first alignment operation, one or more of a rotation value, a transformation value, or an error value for the first cluster; and
determining the first motion characteristic using the one or more of the rotation value, the transformation value, or the error value determined for the first cluster.

14. The method of claim 13, wherein the determining the second motion characteristic for the second cluster comprises:
performing a second alignment operation using the first plurality of points of the second cluster, the second plurality of points of the second cluster, and the third plurality of points of the second cluster;
determining, based on a result of the second alignment operation, one or more of a rotation value, a transformation value, or an error value for the second cluster; and
determining the second motion characteristic using the one or more of the rotation value, the transformation value, or the error value determined for the second cluster.

15. The method of claim 13, wherein the performing the first alignment operation uses a trimmed iterative closest point algorithm.

16. The method of claim 10, wherein the first point cloud is generated by a LiDAR sensor.

17. The method of claim 10, further comprising selecting the first threshold based on a size of a vehicle.

18. A method for merging clusters comprising:
receiving, at a first time, a first point cloud for a first cluster and a second cluster, wherein the first point cloud includes a first plurality of points for the first cluster and a first plurality of points for the second cluster;
determining a distance between the first cluster and the second cluster;
in response to a determination that the distance satisfies a first threshold:
receiving, at a second time, a second point cloud for the first cluster and the second cluster, wherein the second point cloud includes a second plurality of points for the first cluster and a second plurality of points for the second cluster;
determining, based on the first plurality of points for the first cluster and the second plurality of points for the first cluster, a first motion characteristic for the first cluster; and
determining, based on the first plurality of points for the second cluster and the second plurality of points for the second cluster, a second motion characteristic for the second cluster; and
in response to a determination that the first motion characteristic and the second motion characteristic satisfy a second threshold:
determining to merge the first cluster and the second cluster.

19. The method of claim 18, further comprising:
in response to a determination that the distance does not satisfy the first threshold:
determining not to merge the first cluster and the second cluster.

20. The method of claim 18, further comprising:
in response to a determination that the first motion characteristic and the second motion characteristic do not satisfy the second threshold:
determining not to merge the first cluster and the second cluster.

21. The method of claim 18, wherein the first point cloud is generated by a LiDAR sensor.

* * * * *